United States Patent
Huang

[11] Patent Number: 6,089,747
[45] Date of Patent: Jul. 18, 2000

[54] ICE CREAM MAKING APPARATUS

[76] Inventor: Olivia Huang, No. 2, Lane 403, Sec. 3, Chung-Shan Rd., Wu-Jih Hsiang, Taichung Hsien, Taiwan

[21] Appl. No.: 09/413,302

[22] Filed: Oct. 6, 1999

[51] Int. Cl.[7] .............. A23G 9/00; A23G 9/12; A23G 9/20; B01F 7/16; B01F 15/06

[52] U.S. Cl. .............. 366/149; 62/342; 99/348; 99/455; 366/279

[58] Field of Search .............. 99/348, 452–455, 99/460–466, 470, 517; 62/342, 343, 354; 366/144–149, 247, 279, 205, 293, 230, 290, 295, 312, 320, 324, 601

[56] References Cited

U.S. PATENT DOCUMENTS

| | | | |
|---|---|---|---|
| 4,070,957 | 1/1978 | Korekawa et al. | 99/455 |
| 4,583,863 | 4/1986 | Pandolfi | 366/149 |
| 4,632,566 | 12/1986 | Masel et al. | 62/343 X |
| 4,643,583 | 2/1987 | Cecchini | 366/149 |
| 4,664,529 | 5/1987 | Cavalli | 366/144 X |
| 4,708,489 | 11/1987 | Carlson | 366/149 |
| 4,716,822 | 1/1988 | O'Brien | 99/455 |
| 4,974,965 | 12/1990 | Heinhold et al. | 99/455 X |
| 5,076,153 | 12/1991 | Takahashi et al. | 99/327 |
| 5,351,606 | 10/1994 | Matsuzaki | 99/348 |
| 5,363,746 | 11/1994 | Gordon | 99/328 |
| 5,433,139 | 7/1995 | Kitagawa et al. | 99/327 |
| 5,549,042 | 8/1996 | Bukoschek et al. | 62/342 X |

*Primary Examiner*—Timothy Simone
*Attorney, Agent, or Firm*—Trop, Pruner & Hu, P.C.

[57] ABSTRACT

An ice cream making apparatus includes an inner container having a first bottom formed with a first bottom opening, and an outer container surrounding the inner container to confine a coolant storing space therebetween. The outer container has a second bottom formed with a second bottom opening, and an outer rim extending along and upwardly from the second bottom opening. The outer rim has a shoulder extending radially and inwardly therefrom adjacent to the first bottom opening and confronting the first bottom of the inner container. A sealing ring is disposed between the shoulder and the first bottom of the inner container. A hollow tightening member extends through the first and second bottom openings, and abuts against the first bottom of the inner container and the outer rim so as to press the shoulder and the first bottom of the inner container to abut tightly against the sealing ring for preventing coolant from leaking out from the coolant storing space.

10 Claims, 5 Drawing Sheets

ICE CREAM MAKING APPARATUS

BACKGROUND OF THE INVENTION

1. Field of the Invention

This invention relates to an ice cream making apparatus, more particularly to an ice cream making apparatus having a sealing mechanism for preventing coolant from leaking out.

2. Description of the Related Art

FIG. 1 illustrates a conventional ice cream making apparatus 10. The apparatus 10 includes a stand, and an outer container 11 mounted on the stand for receiving and supporting a cooling container 12. The cooling container 12 is a single piece container having outer and inner walls, a coolant storing space formed between the inner and outer walls, and a bottom opening 121 for passage of ice cream. Since the coolant storing space is sealed via screw means 122 passing through the bottom opening 121, leakage of coolant from the coolant storing space may easily occur at the bottom opening 121.

SUMMARY OF THE INVENTION

Therefore, it is an object of the present invention to provide an ice cream making apparatus that is capable of overcoming the aforementioned problem.

Accordingly, an ice cream making apparatus of this invention comprises: an inner container having a first bottom formed with a first bottom opening; an outer container surrounding and spaced apart from the inner container to confine a coolant storing space therebetween, the outer container having a second bottom formed with a second bottom opening aligned with the first bottom opening, and an outer rim extending along and upwardly from the second bottom opening toward the first bottom of the inner container, the outer rim having a diameter greater than the first bottom opening, and a shoulder extending radially and inwardly thereof adjacent to the first bottom opening and confronting the first bottom of the inner container; a sealing ring disposed between the shoulder and the first bottom of the inner container; and a hollow tightening member extending through the first and second bottom openings, and abutting against the first bottom of the inner container and the outer rim so as to press the shoulder and the first bottom of the inner container to abut tightly against the sealing ring for preventing coolant from leaking out from the coolant storing space.

BRIEF DESCRIPTION OF THE DRAWINGS

In drawings which illustrate an embodiment of the invention.

DETAILED DESCRIPTION OF THE PREFERRED EMBODIMENT

Figure 1:
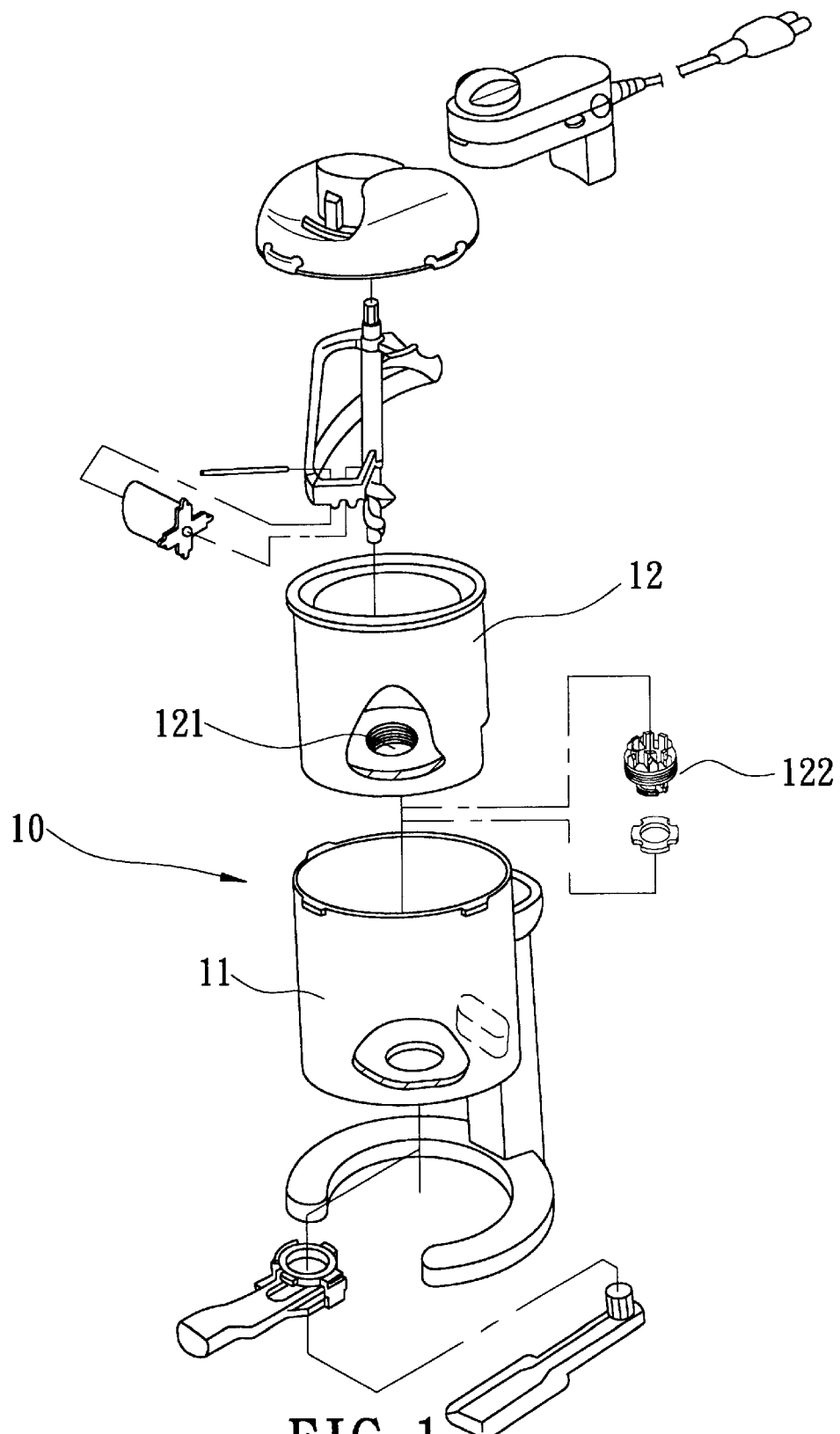
FIG. 1 is an exploded view of a conventional ice cream making apparatus.
Figure 2:
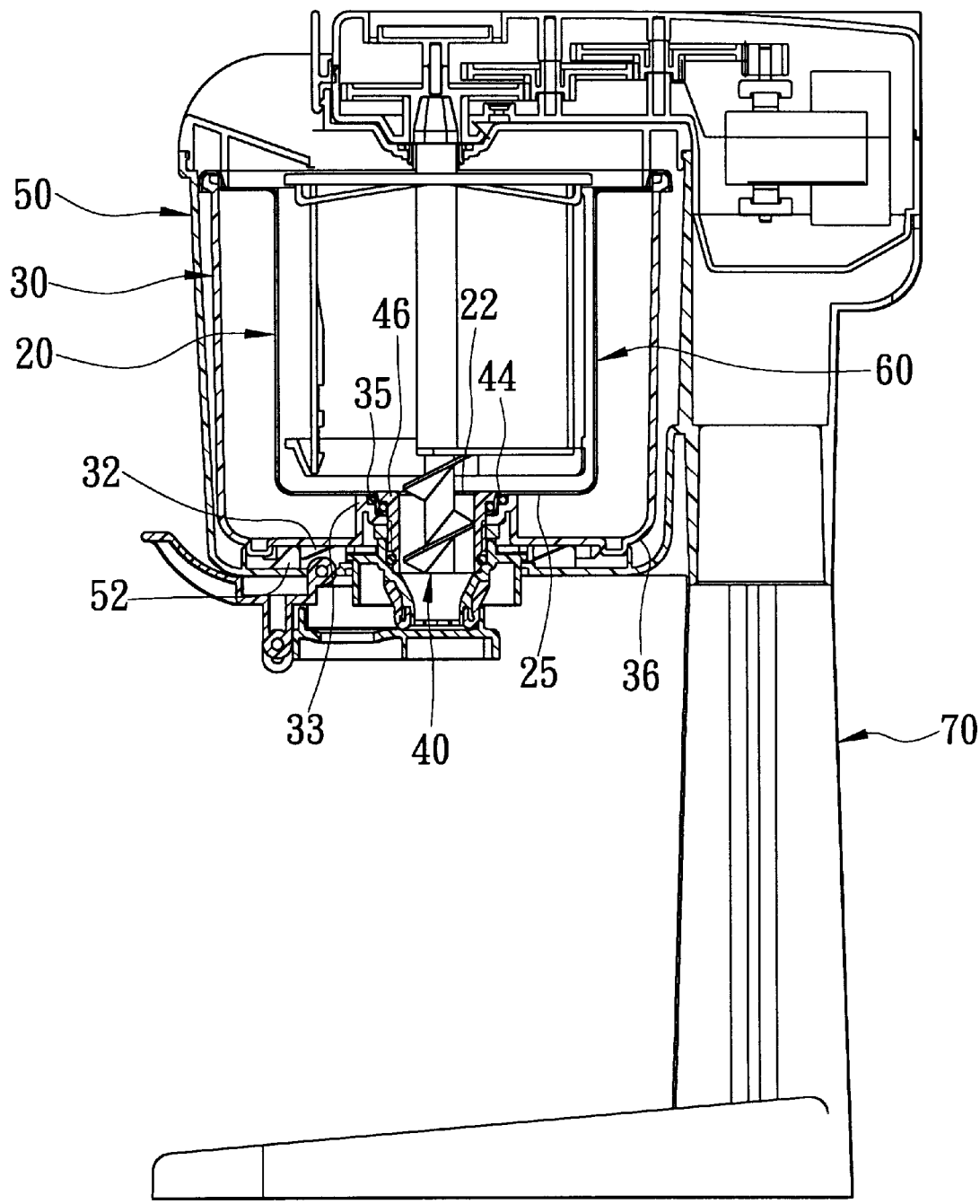
FIG. 2 is a cross-sectional side view of an ice cream making apparatus embodying this invention.
Figure 3:
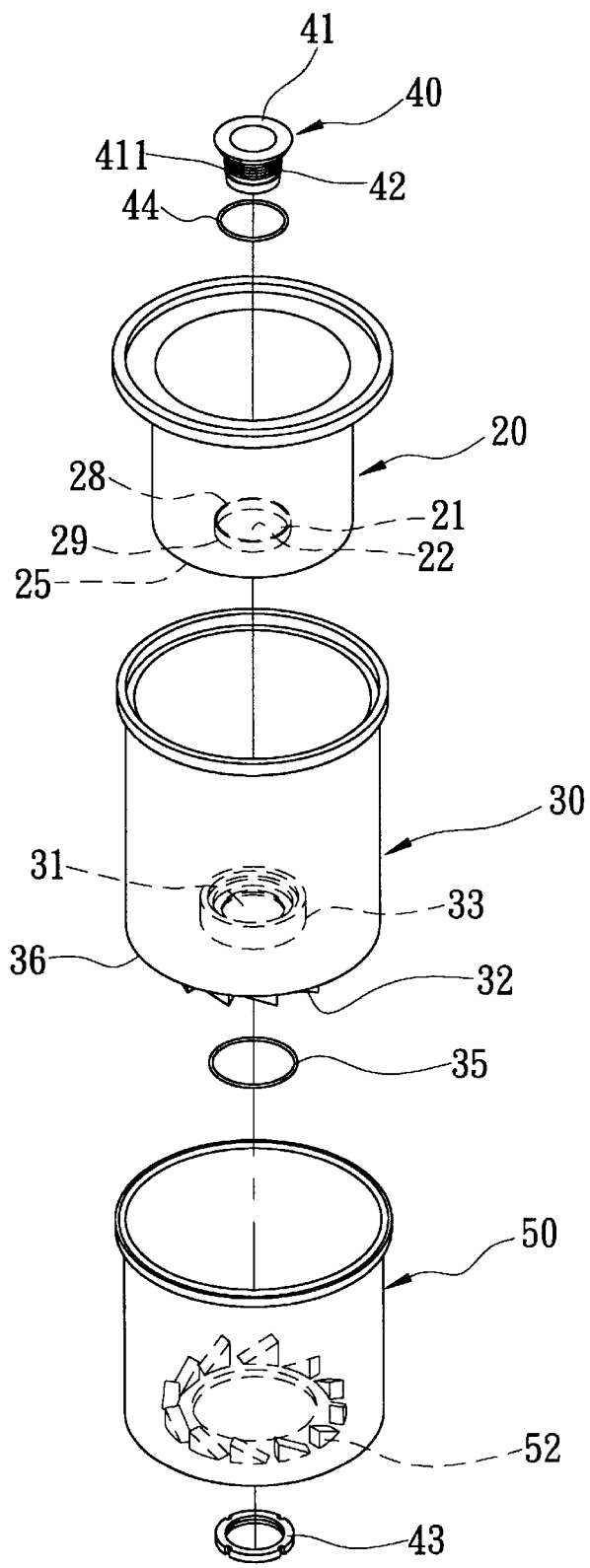
FIG. 3 is a fragmentary exploded view of the ice cream making apparatus of FIG. 2.
Figure 4:
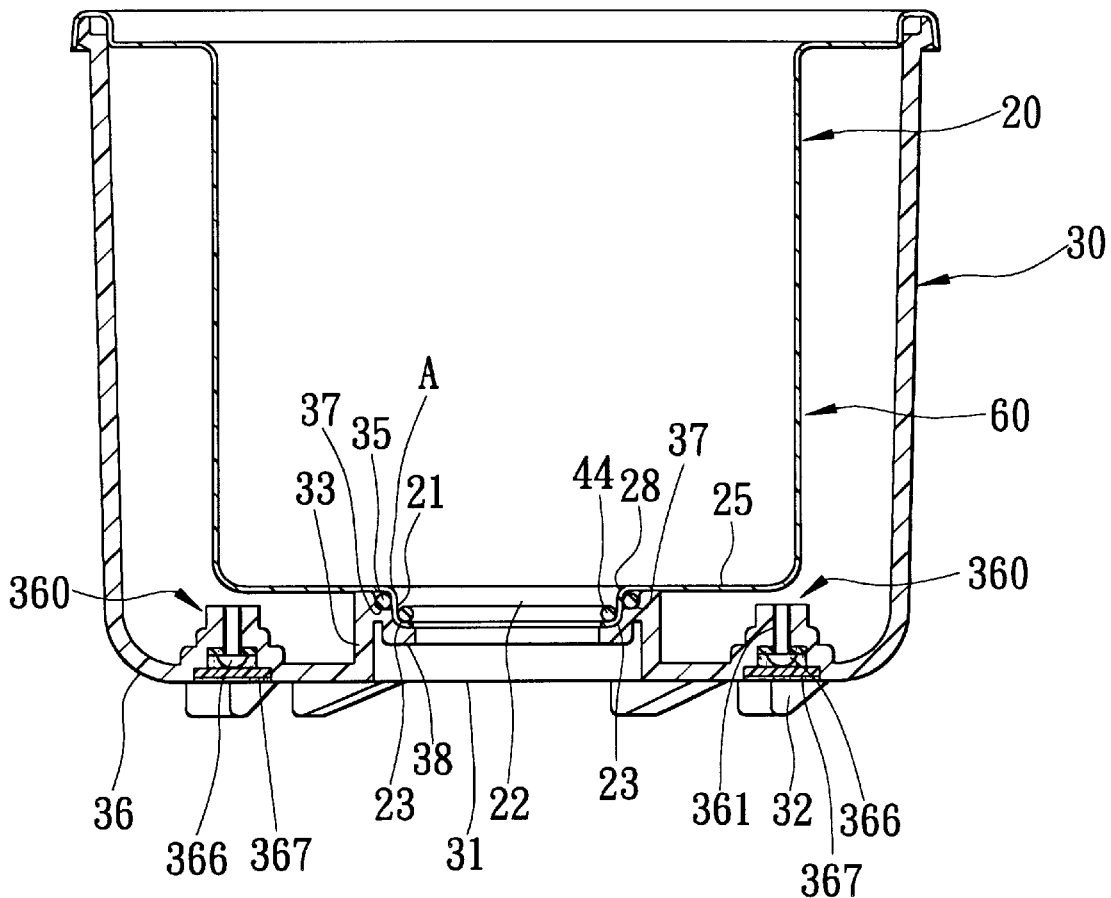
FIG. 4 is a fragmentary cross-sectional side view of the ice cream making apparatus of FIG. 2.
Figure 5:
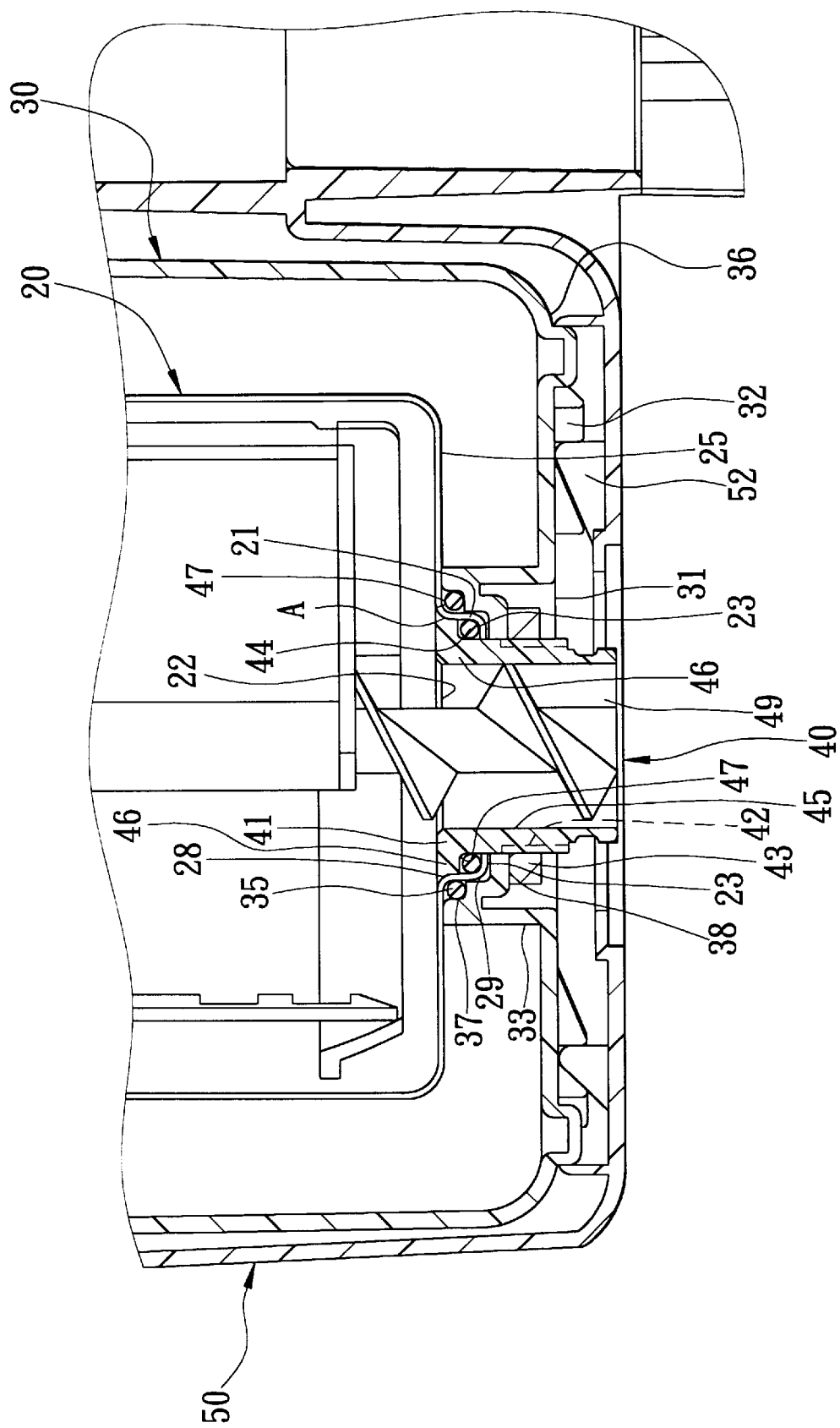
FIG. 5 is another fragmentary cross-sectional side view of the ice cream making apparatus of FIG. 2.

FIGS. 2 to 5 illustrate an ice cream making apparatus embodying this invention. The ice cream making apparatus of this invention includes a stand 70, a supporting container 50 mounted on the stand 70, an outer container 30 disposed inside the supporting container 50, an inner container 20 disposed inside and spaced apart from the outer container 30 to form a coolant storing space 60 between the inner and outer containers 20, 30, and a sealing mechanism engaging the inner and outer containers 20, 30 for sealing the coolant storing space 60.

The inner container 20 includes a first bottom 25 formed with a first bottom opening 22, and an inner rim 21 extending along and downwardly from the first bottom opening 22. The inner rim 21 has top and bottom ends 28, 29, and a second shoulder 23 extending radially and inwardly of the first rim 21 from the bottom end 29 of the inner rim 21. The top end 28 of the inner rim 21 and the bottom 25 of the inner container 20 form a rounded corner (A) therebetween.

The outer container 30 includes a second bottom 36 formed with a second bottom opening 31 aligned with the first bottom opening 22, and an outer rim 33 extending along and upwardly from the second bottom opening 31 to abut against the first bottom 25 of the inner container 20 and surrounding the inner rim 21. The outer rim 33 has a diameter greater than the first bottom opening 22, a first shoulder 37 extending radially and inwardly therefrom adjacent to the first bottom opening 22 and confronting the first bottom 25 of the inner container 20, and a third shoulder 38 extending radially and inwardly from a bottom side of the first shoulder 37, and disposed below and abutting against the second shoulder 23.

The sealing mechanism of this invention includes a hollow tightening member 40, and first and second sealing rings 35, 44. The hollow tightening member 40 has a hollow tubular piece 45 extending through the first and second bottom openings 22, 31. The tubular piece 45 defines a passageway 49 therein for passage of ice cream, and has a headed top end 46 extending radially and outwardly therefrom and aligned with and disposed above the second shoulder 23, and a threaded portion 42 which is opposite to the headed top end 46 and which is attached with a nut component 43 via screw means. The nut component 43 is disposed below and is aligned with the third shoulder 38. The first and second sealing rings 35, 44 are disposed between the first shoulder 37 and the first bottom 25 of the inner container 20, and between the second shoulder 23 and the headed top end 46 of the tubular piece 45, respectively. The headed top end 46 of the tubular piece 45 has a curved face 47 engaging the rounded corner (A). The first bottom 25 of the inner container 20 and the first shoulder 37 abut sealingly against the first sealing ring 35, and the second shoulder 23 and the headed top end of the tubular piece 45 abut sealingly against the second sealing ring 44 when the nut component 43 is tightened on the threaded portion 42 of the tubular piece 45.

The outer container 30 further includes two opposing injection ports 360 extending from the second bottom 36 of the outer container 30 into the coolant storing space 60. Each injection port 360 is formed with a stepped channel 361 which extends into and which is communicated with the coolant storing space 60. A headed plug 366 extends into the stepped channel 361, and a sealant is applied to an outlet 367 of the stepped channel 361 so as to seal the stepped channel 361.

The supporting container 50 includes a third bottom 55 and a plurality of lower teeth 52 extending upwardly from the third bottom 55. A plurality of upper teeth 32 extend downward from the second bottom 36 of the outer container

30, and engage the lower teeth 52 so as to confine the movement of the inner and outer containers 20, 30.

With the invention thus explained, it is apparent that various modifications and variations can be made without departing from the spirit of the present invention. It is therefore intended that the invention be limited only as recited in the appended claims.

I claim:

1. An ice cream making apparatus, comprising:

an inner container having a first bottom formed with a first bottom opening;

an outer container surrounding and spaced apart from said inner container to confine a coolant storing space therebetween, said outer container having a second bottom formed with a second bottom opening aligned with said first bottom opening, and an outer rim extending along and upwardly from said second bottom opening toward said first bottom of said inner container, said outer rim having a diameter greater than said first bottom opening, and a first shoulder extending radially and inwardly therefrom adjacent to said first bottom opening and confronting said first bottom of said inner container;

a first sealing ring disposed between said first shoulder and said first bottom of said inner container; and a hollow tightening member extending through said first and second bottom openings, and abutting against said first bottom of said inner container and said outer rim so as to press said first shoulder and said first bottom of said inner container to abut tightly against said first sealing ring for preventing coolant from leaking out from said coolant storing space.

2. The apparatus of claim 1, wherein said inner container further includes an inner rim extending along and downwardly from said first bottom opening toward said second bottom opening, and surrounded by said outer rim so as to confine said first sealing ring between said inner and outer rims.

3. The apparatus of claim 2, wherein said inner rim has a top end connected to said first bottom opening, a bottom end opposing said top end, and a second shoulder extending radially and inwardly from said bottom end, said tightening member having a hollow tubular piece and a nut component, said tubular piece extending through said first and second bottom openings, and having a headed top end extending radially and outwardly therefrom, aligned above said second shoulder, and abutting against said first bottom of said inner container, said tubular piece further having a threaded portion opposite to said headed top end and disposed below said second shoulder, said nut component being screwed on said threaded portion and abutting against said outer rim.

4. The apparatus of claim 3, further comprising a second sealing ring disposed between said headed top end and said second shoulder such that said first bottom of said inner container and said first shoulder abut sealingly against said first sealing ring, and such that said second shoulder and said headed top end abut sealingly against said second sealing ring when said nut component is tightened on said threaded portion.

5. The apparatus of claim 4, wherein said top end of said inner rim and said first bottom of said inner container form a rounded corner therebetween, said headed top end having a curved face engaging said rounded corner.

6. The apparatus of claim 5, wherein said hollow tubular piece defines a passageway therein for communicating with said first bottom opening for passage of ice cream.

7. The apparatus of claim 6, wherein said outer rim extends upwardly to abut against said first bottom of said inner container.

8. The apparatus of claim 7, wherein said outer rim further has a third shoulder extending radially and inwardly therefrom, aligned below and abutting against said second shoulder, said nut component abutting against said third shoulder when said nut component is tightened on said threaded portion.

9. The apparatus of claim 8, further comprising a supporting container surrounding and supporting said outer container, said outer container having a plurality of upper teeth extending downwardly from a bottom side of said second bottom, said supporting container having a third bottom and a plurality of lower teeth extending upwardly from a bottom side of said third bottom so as to engage said first teeth.

10. The apparatus of claim 9, wherein said outer container further includes at least one injection port extending from said second bottom into said coolant storing space, said injection port defining a stepped channel which extends into and which is communicated with said storing space, and having a headed plug which extends into said stepped channel so as to seal said stepped channel.

\* \* \* \* \*